United States Patent
Winslow (12)

(10) Patent No.: US 6,198,992 B1
(45) Date of Patent: *Mar. 6, 2001

(54) OVERRIDE FOR GUIDANCE CONTROL SYSTEM

(75) Inventor: Phillip D. Winslow, Hayward, CA (US)

(73) Assignee: Trimble Navigation Limited, Sunnyvale, CA (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/948,843

(22) Filed: Oct. 10, 1997

(51) Int. Cl.[7] .................................. B62D 5/04; B62D 1/22
(52) U.S. Cl. .............................. 701/23; 701/25; 701/41; 180/443
(58) Field of Search ................................ 701/23, 25, 28, 701/41, 43, 201, 96; 180/169, 443

(56) References Cited

U.S. PATENT DOCUMENTS

| 3,765,501 | * | 10/1973 | Burvee ................... 180/401 |
| 3,946,825 | * | 3/1976 | Gail ...................... 180/401 |
| 4,155,417 | * | 5/1979 | Ziems .................... 180/271 |
| 4,515,221 | * | 5/1985 | van der Lely ............. 172/3 |
| 5,103,924 | * | 4/1992 | Walker ................... 180/401 |
| 5,204,814 | * | 4/1993 | Noonan et al. ............ 701/25 |
| 5,234,070 | * | 8/1993 | Noah et al. .............. 180/169 |
| 5,245,422 | * | 9/1993 | Borcherts et al. ......... 358/103 |
| 5,684,476 |   | 11/1997 | Anderson ................. 340/988 |
| 5,765,116 | * | 6/1998 | Wilson-Jones et al. ...... 701/41 |
| 5,774,069 |   | 6/1998 | Tanaka et al. ............ 340/903 |
| 5,778,327 | * | 7/1998 | Simmons et al. ........... 701/23 |
| 5,835,870 | * | 11/1998 | Kagawa ................... 701/23 |

* cited by examiner

*Primary Examiner*—Tan Nguyen
(74) *Attorney, Agent, or Firm*—Wagner, Murabito & Hao LLP

(57) ABSTRACT

A method and apparatus which overrides a guidance control system so as to disengage the automatic steering control feature when an emergency condition is determined to exist. A sensor is coupled to the steering system which detects movement of the steering wheel. When movement of the steering wheel is sufficiently abrupt, the logic of the override system generates an override signal. The override signal is communicated to the guidance control system so as to return control of the vehicle to the user. The sensor is connected to either the steering wheel itself or to the hydraulic system. When the vehicle includes an electro-hydraulic system, the logic system may be directly connected to the electrical circuits of the electro-hydraulic system. Multiple sensors may be used for activation of the override. In one embodiment a sensor is coupled to the braking system for sensing depression of the brake pedal. In another embodiment, a sensor is coupled to the clutch system for sensing depression of the clutch petal. In an alternate embodiment, the speed and rate of turn of the vehicle are compared to the turn rate profile of the vehicle to determine whether an emergency condition exists. In yet another embodiment, a tilt rate sensor is also used to determine if an emergency condition exists.

3 Claims, 9 Drawing Sheets

OVERRIDE FOR GUIDANCE CONTROL SYSTEM

TECHNICAL FIELD

This invention relates to vehicle automated guidance control systems. Specifically, the present invention relates to a method and apparatus for overriding a vehicle guidance control system.

BACKGROUND ART

Tractors and other vehicles used in farming operations must be operated precisely to obtain uniform rows during planting and to harvest crops efficiently. Typically tractors used for planting rows of crops are operated manually by an operator who drives the tractor along each row to be planted. The operator must be very careful in order to get uniform rows of planted crops. It is difficult for an operator of a tractor to maintain precise positioning of the tractor relative to rows which have already been planted since the operator has no reference other than the position of the row which was most recently been planted to use as a guide. In addition, it is difficult to maintain the concentration necessary to obtain straight rows, particularly since concentration often decreases with each passing hour and minute of planting.

One prior art method for obtaining uniform rows includes the placement of stakes on each side of a planned row. The operator uses the first stake to precisely align the tractor prior to the planting of the row, the operator then drives the tractor towards the stake at the opposite end of the row, sighting the stake to obtain the desired alignment, this method gives the driver a way to assure that each row is started at the right location and gives the operator a guide for properly aligning the tractor. However, since the tractor is still controlled by an operator who must concentrate in order to obtain good alignment, this process still produces rows of crops that are not precisely aligned.

Another prior art method for obtaining uniform rows includes the use of a sighting bar which extends horizontally from the side of the tractor. This sighting bar is positioned over the previously planted row so as to align the tractor with the previous row. This method gives relatively good results as long as the driver is diligent in maintaining the required alignment. However, when the operator does not precisely align a row, each subsequent row is also misaligned. This results in rows that have dips and turns in each row. Often, due to the difficulty of maintaining precise alignment, where the preceding row deviates, the row being planted deviates even more, causing a variance that increases with each row planted.

In an attempt to make the job of planting easier on the operator, manufacturers of tractors have recently attempted to integrate automated guidance controls for tractors. Guidance controls for tractors typically incorporate a method for position determination such as use of a global positioning system. However, other position determination systems may also be used. These guidance control systems typically include a position determining system for determining position and a vehicle control system for controlling the steering of the vehicle. One method for position determination involves the use of satellites of the US Global Positioning System (GPS) to determine position. The guidance system typically also includes a vehicle control system operable in response to an operator input mechanism. In one such system, the operator positions the tractor at the beginning of a row in response to feedback on a display.

The display may indicate the position of the vehicle or indicate the direction that the operator must move in order to properly determine the appropriate starting point for a row. Once the operator is properly positioned and is ready to start planting a row, he operates the operator input device so as to activate the automatic steering control feature of the guidance control system. The automatic steering control feature of the guidance control system operates the steering of the tractor so as to maintain proper alignment of the vehicle as a row is planted. After traversing the length of the row, the operator disengages the automatic steering control feature of the guidance control system by operation of the operator input device. The operator then turns the tractor around and positions it to start the next row Though the guidance control system produces precisely aligned rows, problems may result due to the fact that the operator cannot control the tractor. When the guidance control system is in the automatic steering control mode, the user cannot steer the tractor. Typically, only by manually disengaging the automatic steering control feature of the guidance control system may the operator obtain control of the vehicle. In order to disengage the automatic steering control feature of the guidance control system, the operator must look down and operate one or more keys, and/or levers, and/or buttons. Often when collision with an obstacle such as a tree trunk, a rock, or another vehicle is imminent, there is insufficient time to perform the required steps, resulting in the tractor hitting the obstacle.

What is needed is a way to make guidance control systems more safe. In particular, what is needed is a way to allow an operator to disengage the automatic steering control feature of a guidance control system quickly in order to avoid obstacles. The present invention meets the above needs.

DISCLOSURE OF THE INVENTION

The present invention provides a method and apparatus which allows for overriding the guidance control system of a vehicle when an emergency condition exists.

In one embodiment one or more sensors coupled to the vehicle steering system are monitored so as to determine if an emergency condition exists. In one embodiment, when the operator turns the steering wheel such that the amount of movement of the steering wheel exceeds a predetermined threshold, an emergency condition is determined to exist. Alternatively the rate of turn of the steering wheel is determined and an emergency condition is determined to exist when the rate of turn exceeds a predetermined threshold. Also, both rate of turn and amount of movement of the steering wheel may be used to determine whether an emergency condition exists.

In another embodiment, one or more sensors coupled to the vehicle brake system are monitored so as to determine if an emergency condition exists. In one embodiment, when the operator moves the brake pedal such that the amount of movement of the brake pedal exceeds a predetermined threshold, an emergency condition is determined to exist. Alternatively the rate of movement of the brake pedal is determined and an emergency condition is determined to exist when the rate of movement exceeds a predetermined threshold. In one embodiment, both rate of movement and amount of movement of the brake pedal is be used to determine whether an emergency condition exists. The monitoring of the vehicle brake system may be performed in conjunction with the monitoring of the steering wheel such that movement of either the steering wheel or the brake pedal may generate an override condition such that the control of the vehicle is turned over to the operator of the vehicle.

Thus, when an obstacle such as a tree stump or another vehicle is detected that could damage the vehicle and/or injure the operator, the operator may quickly disengage the automatic steering control feature of the steering control system by hitting the brakes or by turning the steering wheel such that he regains the control of the vehicle. He may then take action to avoid the obstacle.

In one embodiment, the vehicle is monitored during turns to determine whether the turn to be performed exceeds the vehicle manufacturers specifications such that the vehicle may turn over. Manufacturers typically publish turn rate profiles for each vehicle which specify the maximum safe rate of turn for specific turning speeds at different incline levels. By comparing the rate of turn indicated by a guidance control system and the speed of the vehicle to the turn rate profile for a level surface, the override system of the present invention may determine whether or not the indicated turn would cause the vehicle to turn over. When the indicated turn would cause the vehicle to turn over, an emergency condition is deemed to exist and the automatic steering control feature is disengaged so as to return control of the vehicle to the operator. In one embodiment, a tilt sensor is used to determine the tilt of the vehicle such that the rate of turn indicated by a guidance control system and the speed of the vehicle may be compared to the turn rate profile for the given tilt level to determine whether or not the indicated turn would cause the vehicle to turn over.

In one embodiment, the override system of the present invention includes an input device and a display such that the operator may set the thresholds for determining whether an emergency condition exists by operation of the input device. This allows the operator of the vehicle to set one or all of the thresholds to levels that suit his driving habits and the current conditions under which the vehicle is being operated. However, in one embodiment, the user is not allowed to set the threshold for determining whether the rate of turn exceeds the turn rate profile so as to prevent the operator from inadvertently allowing the vehicle to turn over.

Though the present invention is described with reference to use in a vehicle which is a tractor, the present invention may be used in other types of vehicles such as, for example, harvesters, wind rowers, spray rigs, fertilizer delivery vehicles, pesticide delivery vehicles, track vehicles, belt driven tractors, and harvest collection vehicles such as general purpose trucks, flat bed trucks, and tractor-trailer rigs.

These and other objects and advantages of the present invention will no doubt become obvious to those of ordinary skill in the art after having read the following detailed description of the preferred embodiments which are illustrated in the various drawing figures.

BRIEF DESCRIPTION OF THE DRAWINGS

The accompanying drawings, which are incorporated in and form a part of this specification, illustrate embodiments of the invention and, together with the description, serve to explain the principles of the invention.

BEST MODE FOR CARRYING OUT THE INVENTION

Figure 1:
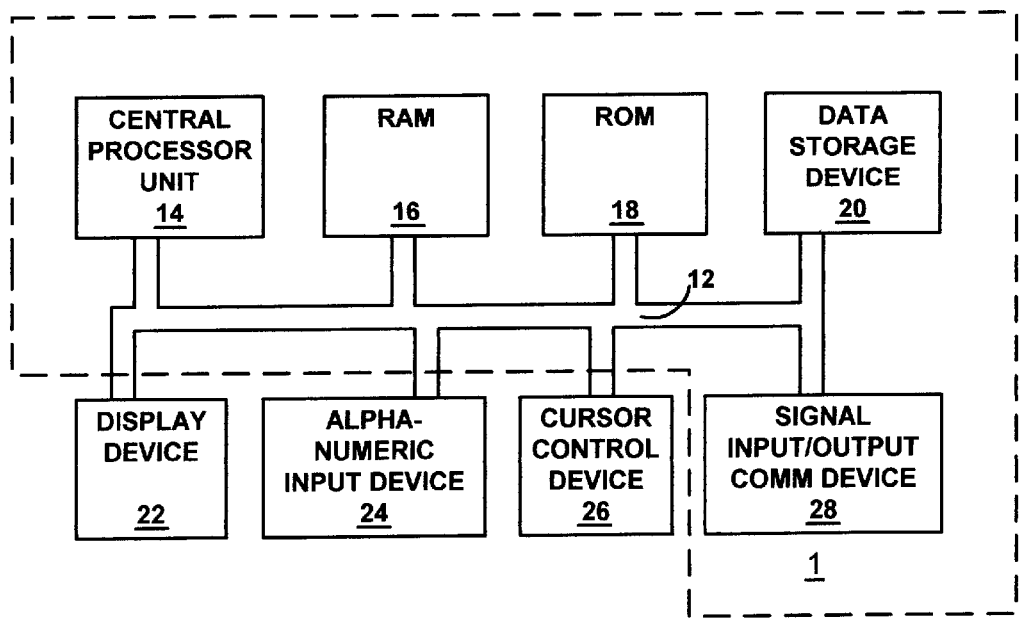
FIG. 1 is a schematic diagram of an exemplary computer system used as a part of an override system in accordance with the present invention.

Reference will now be made in detail to the preferred embodiments of the invention, examples of which are illustrated in the accompanying drawings. While the invention will be described in conjunction with the preferred embodiments, it will be understood that they are not intended to limit the invention to these embodiments. On the contrary, the invention is intended to cover alternatives, modifications and equivalents, which may be included within the spirit and scope of the invention as defined by the appended claims. Furthermore, in the following detailed description of the present invention, numerous specific details are set forth in order to provide a thorough understanding of the present invention. However, it will be obvious to one of ordinary skill in the art that the present invention may be practiced without these specific details. In other instances, well known methods, procedures, components, and circuits have not been described in detail as not to unnecessarily obscure aspects of the present invention.

Some portions of the detailed descriptions which follow are presented in terms of procedures, logic blocks, processing, and other symbolic representations of operations on data bits within a computer memory. These descriptions and representations are the means used by those skilled in the data processing arts to most effectively convey the substance of their work to others skilled in the art. In the present application, a procedure, logic block, process, etc., is conceived to be a self-consistent sequence of steps or instructions leading to a desired result. The steps are those requiring physical manipulations of physical quantities. Usually, though not necessarily, these quantities take the form of electrical or magnetic signals capable of being stored, transferred, combined, compared, and otherwise manipulated in a computer system. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present invention, discussions utilizing terms such as "designating", "incorporating", "calculating", "determining", "communicating" or the like, refer to the actions and processes of a computer system, or similar electronic computing device. The computer system or similar electronic computing device manipulates and transforms data represented as physical (electronic) quantities within the computer system's registers and memories into other data similarly represented as physical quantities within the computer system memories or registers or other such information storage, transmission, or display devices. The present invention is also well suited to the use of other computer systems such as, for example, optical and mechanical computers.

Computer System Environment of the Present Invention

With reference now to FIG. 1, portions of the override system of the present invention are comprised of computer executable instructions which reside in a computer system. FIG. 1 illustrates an exemplary computer system 1 used as a part of an override system in accordance with the present invention. It is appreciated that the computer system 1 of FIG. 1 is exemplary only and that the present invention can operate within a number of different computer systems including general purpose computers systems, embedded computer systems, and stand alone computer systems.

Computer system 1 of FIG. 1 includes an address/data bus 12 for communicating information, a central processor unit 14 coupled to bus 12 for processing information and instructions. Computer system 1 also includes data storage features such as a random access memory 16 coupled to bus 12 for storing information and instructions for central processor unit 14, a read only memory 18 coupled to bus 12 for storing static information and instructions for the central processor unit 14, and a data storage device 20 (e.g., a magnetic or optical disk and disk drive) coupled to bus 12 for storing information and instructions. Computer system 1 of the present embodiment also includes a display device 22 coupled to bus 12 for displaying information to a computer operator. An alphanumeric input device 24 including alphanumeric and function keys is coupled to bus 12 for communicating information and command selections to central processor unit 14.

Display device 22 of FIG. 1, utilized with computer system 1 of the present invention, may be a liquid crystal device, cathode ray tube, or other display device suitable for creating graphic images and alphanumeric characters recognizable to the user. Cursor control device 26 allows the computer user to dynamically signal the two dimensional movement of a visible symbol (cursor) on a display screen of display device 22. Many implementations of cursor control device 26 are known in the art including a trackball, mouse, touch pad, joystick or special keys on alphanumeric input device 24 capable of signaling movement of a given direction or manner of displacement. Alternatively, it will be appreciated that a cursor can be directed and/or activated via input from alphanumeric input device 24 using special keys and key sequence commands. The present invention is also well suited to directing a cursor by other means such as, for example, voice commands.

Computer system 1 also includes a cursor control device 26 coupled to bus 12 for communicating user input information and command selections to central processor unit 14, and a signal input output communication device 28 (e.g. a modem) coupled to bus 12 for communicating command selections to central processor unit 14.

Figure 2:
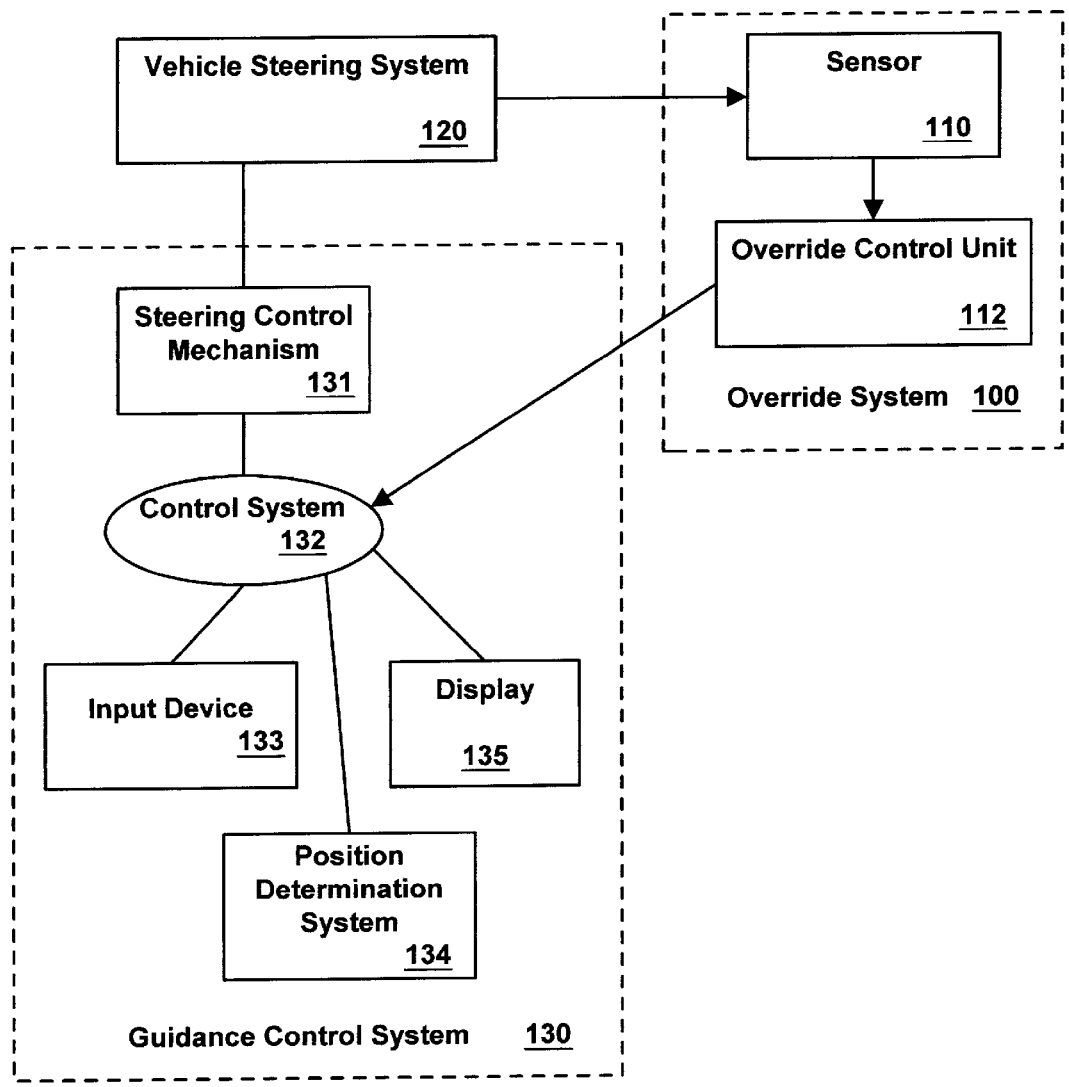
FIG. 2 is a logical representation of an override system that includes a sensor and an override control unit in accordance with the present claimed invention.

FIG. 2 shows an override system for overriding guidance control system 130 which controls vehicle steering system 120. Guidance control system 130 is shown to include steering control mechanism 131 which controls vehicle steering system 120. Steering control mechanism 131 may use any of a number of known methods for controlling vehicle steering system 120. In one embodiment, steering control system is an electro-hydraulic system that interacts with the hydraulic system of vehicle steering system 120 so as to control the steering of a vehicle. Guidance control system 130 also includes control system 132 which, in response to input through input device 133 and position determination system 134 determines steering instructions which are communicated to steering control mechanism 131. Typically, control system 132 includes electronic circuitry which couples instructions to steering control mechanism 131. Display 135 allows a user to monitor the operation of guidance control system 130.

Override system 100 couples to control system 132 of guidance control system 130 of FIG. 2. Sensor 110 is coupled to vehicle steering system 120. Sensor 110 is electrically connected to override control unit 112 such that movement of steering system 120 is communicated to override control unit 112.

Figure 3:
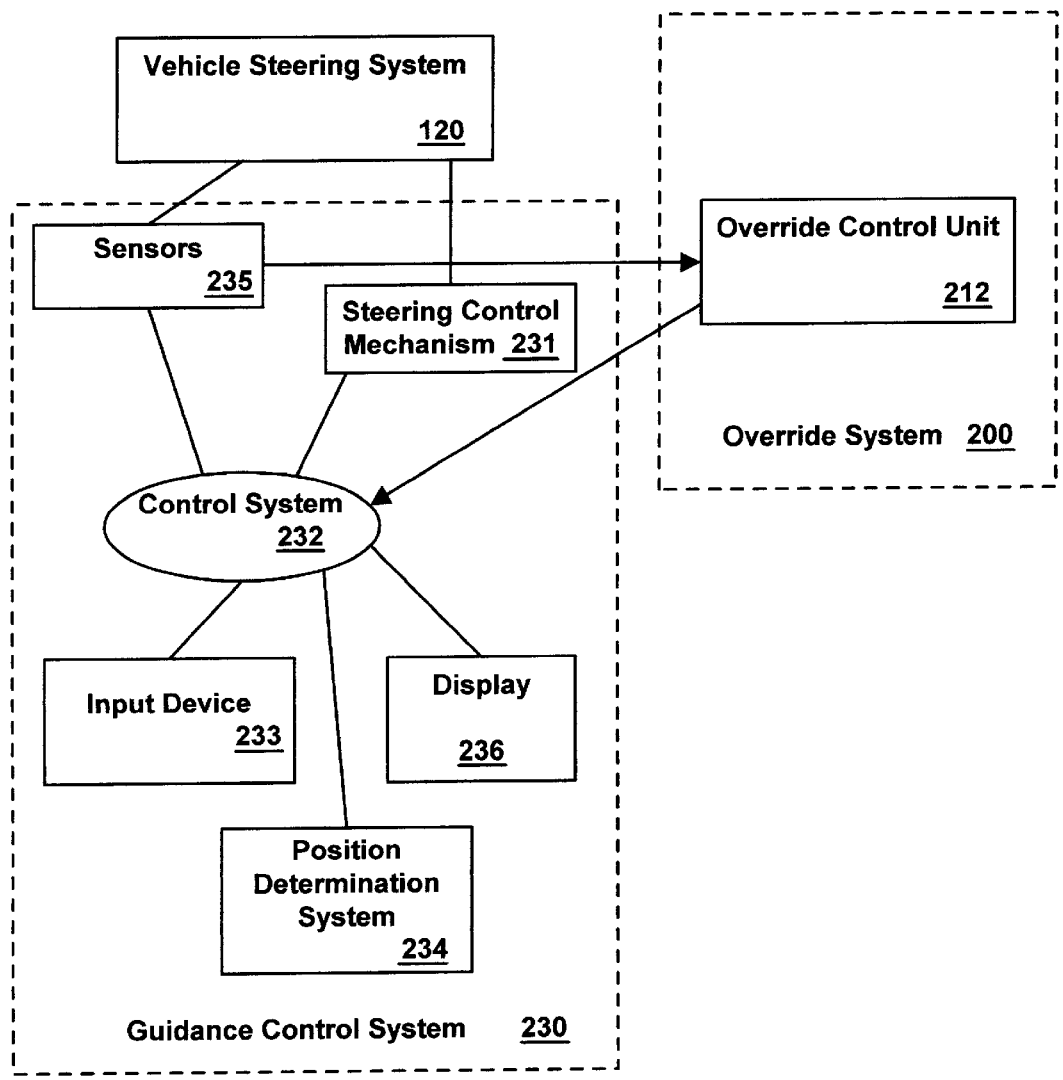
FIG. 3 is a logical representation of an override system that includes an override control unit in accordance with the present claimed invention.

Some guidance control systems include sensors which monitor the movement of the vehicle steering system. One such system is shown in FIG. 3. Guidance control system 230 of FIG. 3 includes sensors 235 which sense movement of and/or operation of vehicle steering system 120. Typically sensors such as sensor 235 are used to obtain data for comparing the actual movement of steering system components to movement anticipated by steering control mechanism 231 so as to provide feedback to control system 232 for more precise control of vehicle steering system 120. Guidance control system 230 includes position determination system 234, display 236, and input device 233.

When an override system is used to control a guidance control system such as guidance control system 230 of FIG. 3, the override system may receive input form the sensors of the guidance control system. Thus, In the embodiment shown in FIG. 3, override system 200 does not require sensors such as sensor 110 of FIG. 2. However, in some instances, one or more of sensors 235 may not be accessible to override system 200, depending on the layout of guidance control system 230. In these instances, it may be desirable to include a sensor such as sensor 110 of FIG. 2 to provide input regarding movement of steering system 120. In addition, when sensors 235 are not electrically compatible with the electronic circuits of override system 200, it may be desirable to include a sensor in override system 200 to provide input regarding movement of steering system 120.

Override control unit 112 of FIG. 2 and override control unit 212 of FIG. 3 include electronic circuits for analyzing movement of vehicle steering system 120. In particular, in one embodiment, override control units 112 of FIG. 2 and 212 of FIG. 3 include computer systems such as computer system 1 of FIG. 1 for analyzing movement of steering system 120. When the movement of the steering system meets the criteria for an override condition, override control unit 112 of FIG. 2 and override control unit 212 of FIG. 3 interact with the guidance control system so as to shut off the automatic steering control feature. When a computer such as computer 1 is used in an override system, the automatic steering control feature is disengaged by sending an instruction from computer 1 to the appropriate location in the connected guidance control system. In the embodiment shown in FIG. 2 the automated control feature is disengaged by sending an instruction to control system 132 and in the embodiment shown in FIG. 3, the automated control feature is disengaged by sending an instruction to control system 232. Alternatively, instructions could be sent to steering control mechanism 131 of FIG. 2 or steering control mechanism 231 of FIG. 3.

Figure 4:
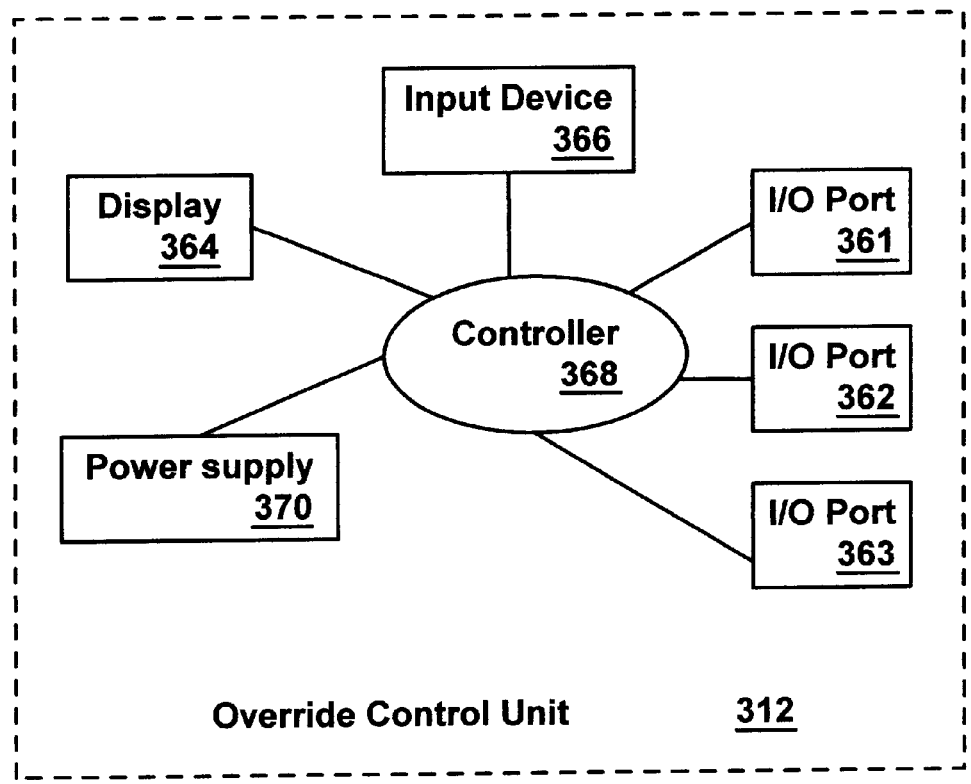
FIG. 4 is a logical representation of an override control unit in accordance with the present claimed invention.

In the embodiment shown in FIG. 4, override control unit 312 does not include all of the components of computer 1 of FIG. 1. Override control unit 312 of FIG. 4 includes controller 368 which is operable in response to input from input device 366 and which is connected with other devices and components through input and output ports such as I/O ports 361–363. Override control unit 312 also includes power supply 370 for providing power and display 364 for visual display. In one embodiment, controller 368 is a integrated circuit device such as a microcontroller or an application specific integrated circuit device (ASIC) or a field programmable gate array (FPGA) device.

In an embodiment where one or more sensors are coupled to override control unit 312 which are analog, override control unit 312 will include an analog to digital converter (not shown) for converting the analog signals received from the sensor or sensors into digital form and coupling the digital signals to controller 368.

Figure 5:
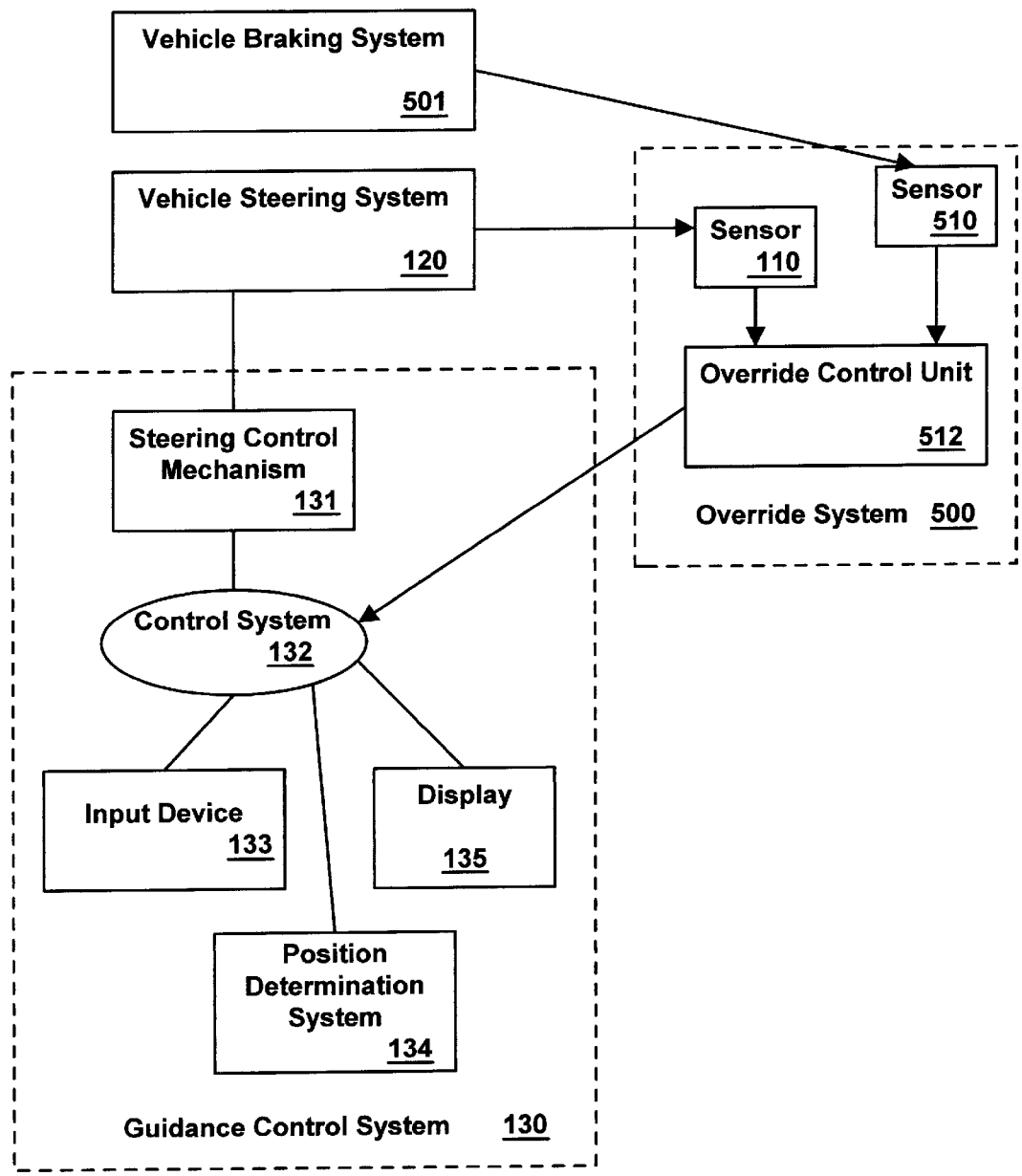
FIG. 5 is a logical representation of an override system having two sensors in accordance with the present claimed invention.

In one embodiment, the override system of the present invention includes provision for engagement of the override condition by operation of the braking system. FIG. 5 shows the vehicle steering system and guidance control system of FIG. 2 to which override control system 500 is coupled. Override system 500 includes sensor 510 which is coupled to the vehicle's braking system, shown generally as vehicle braking system 501. In this embodiment sensor 510 monitors the operation of vehicle braking system 501 so as to provide input to override control unit 512. As shown in FIG. 2, sensor 110 provides input regarding the movement of steering system 120. Override control unit 500, in response to input from sensor 110 and sensor 510, overrides the automatic steering control feature of guidance control system 130 when appropriate.

Figure 6:
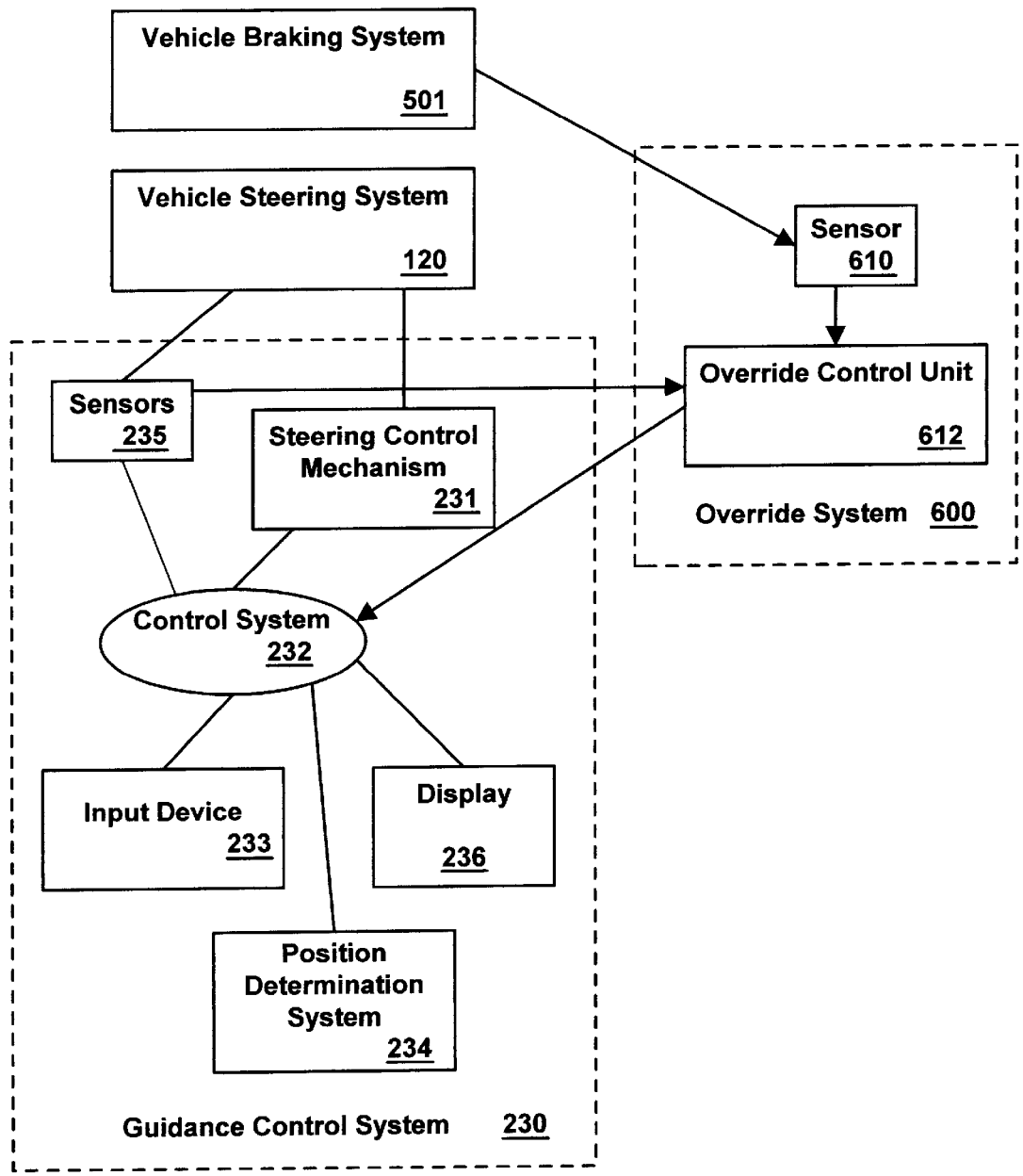
FIG. 6 is a logical representation of an override system including an override control unit and a sensor for monitoring the vehicle braking system in accordance with the present claimed invention.

FIG. 6 shows override system 600 which is coupled to a guidance control system 230 which includes sensors 235. By connection to sensors 235, override control unit 612 obtains input regarding movement of vehicle steering system 120 without the need for a sensor to monitor movement of vehicle steering system such as sensor 110 of FIG. 1 and FIG. 5. In this embodiment sensor 610 monitors the operation of vehicle braking system 501 so as to provide input to override control unit 612. Override control unit 600, in response to input from sensor 235 and sensor 610, overrides the automatic steering control feature of guidance control system 230 when appropriate.

In an alternate embodiment (not shown) the electronics of the vehicle braking system may be directly monitored such that sensor 610 of FIG. 6 is not required. In such an embodiment, connection may be made to the brake light switch which is a part of vehicle braking system 501.

In one embodiment the sensors shown in FIGS. 2–6 are position encoder sensors and/or angular rate encoders, and/or torque encoders, or a combination thereof. Alternatively, limit detectors or electro-hydraulic valves coupled to the hydraulic system or the brake system could be used to determine movement based on volume of fluid flow, and/or fluid flow rate. Also, pressure sensors may be used which detect the pressure of the hydraulic fluid in the manual steering pump or pressure sensors that monitor the fluid pressure of the brake system.

In one embodiment, one or more torque rate encoders are used to monitor movement of the steering column. This type of system is particularly effective for vehicles that have direct steering systems. In such an embodiment, either the torque applied by the operator is used as a threshold or the rate of change of torque is used as a threshold.

Figure 7:
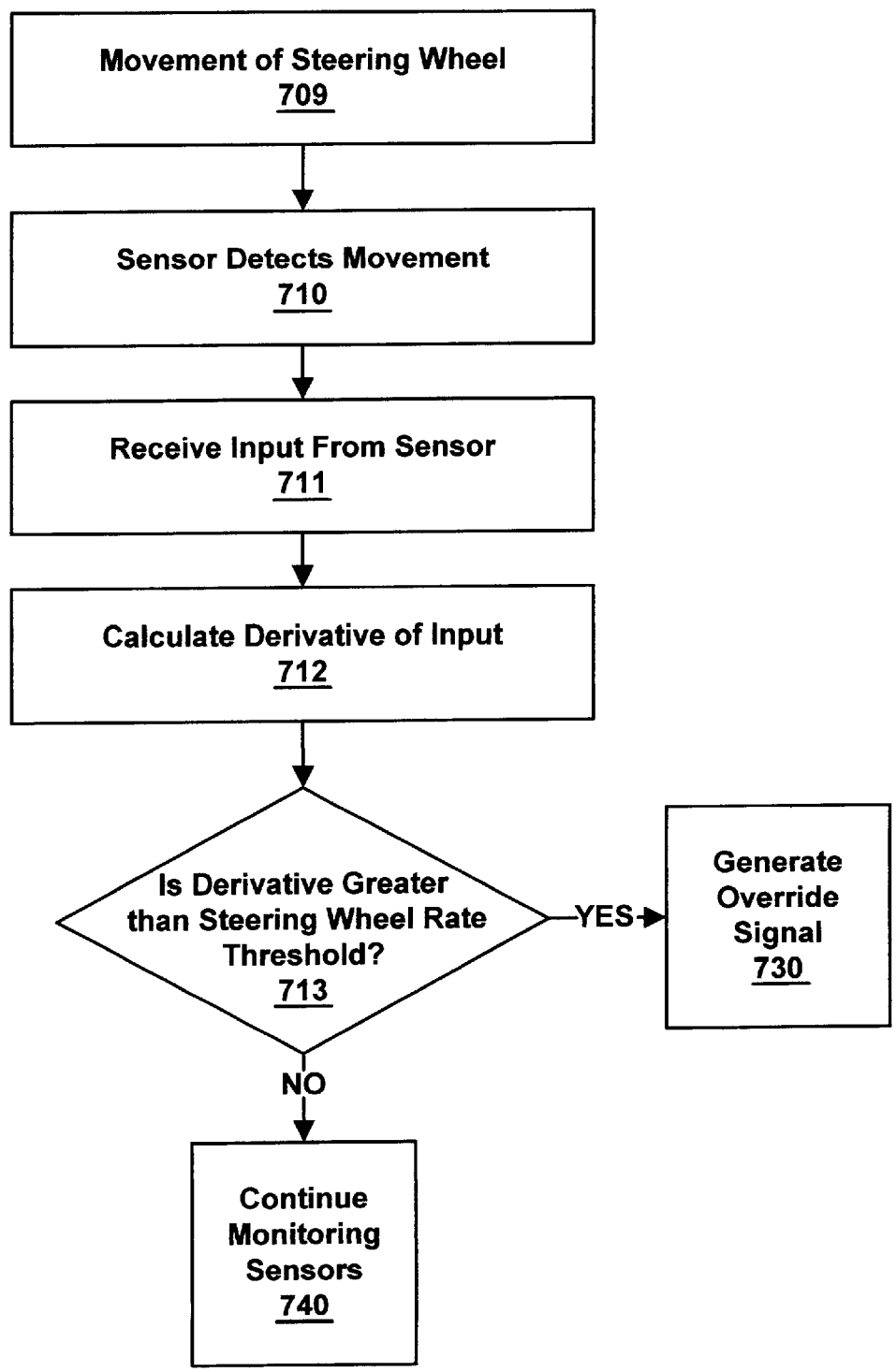
FIG. 7 is a schematic diagram illustrating the steps for overriding a vehicle steering system in accordance with the present claimed invention.

FIG. 7 shows the steps for overriding a vehicle's control system in an embodiment which monitors movement of the steering system. When the operator moves the steering wheel as shown in step 709, the movement of the steering wheel is detected by a sensor as shown by step 710. An electrical signal from the sensor is received as input by the override control unit as shown by step 711. In the embodiment shown in FIG. 2, input is received by override control unit 112 and in the embodiment shown in FIG. 3, the input is received by override control unit 212. The input is preferably in digital form; however the signal may also be in analog form. When the signal is in analog form, it is converted into digital form by the receiving override control unit. The rate of change of the movement of the steering wheel is then analyzed as shown by steps 712–713 to determine if the movement is sufficiently sudden so as to indicate an emergency condition. First, as shown by step 712 the derivative of the input is calculated. The derivative is compared to a predetermined threshold as shown by step 713. If the derivative does not exceed the threshold, an emergency condition will not be indicated and the monitoring of sensors will be continued as shown by step 740. When the derivative does exceed the threshold, as shown by blocks 713 and 730, an override signal is generated. The override signal is transmitted to the guidance control system so as to shut off the automated steering control function of the guidance control system. In the embodiment shown in FIG. 2, the override signal is transmitted to control system 132 and in the embodiment shown in FIG. 3, the override signal is sent to control system 232 so as to shut off the automated steering control functions of guidance control systems 130 of FIG. 2 and 230 of FIG. 3 so as to return control of vehicle steering system 120 to the operator of the vehicle.

Figure 8:
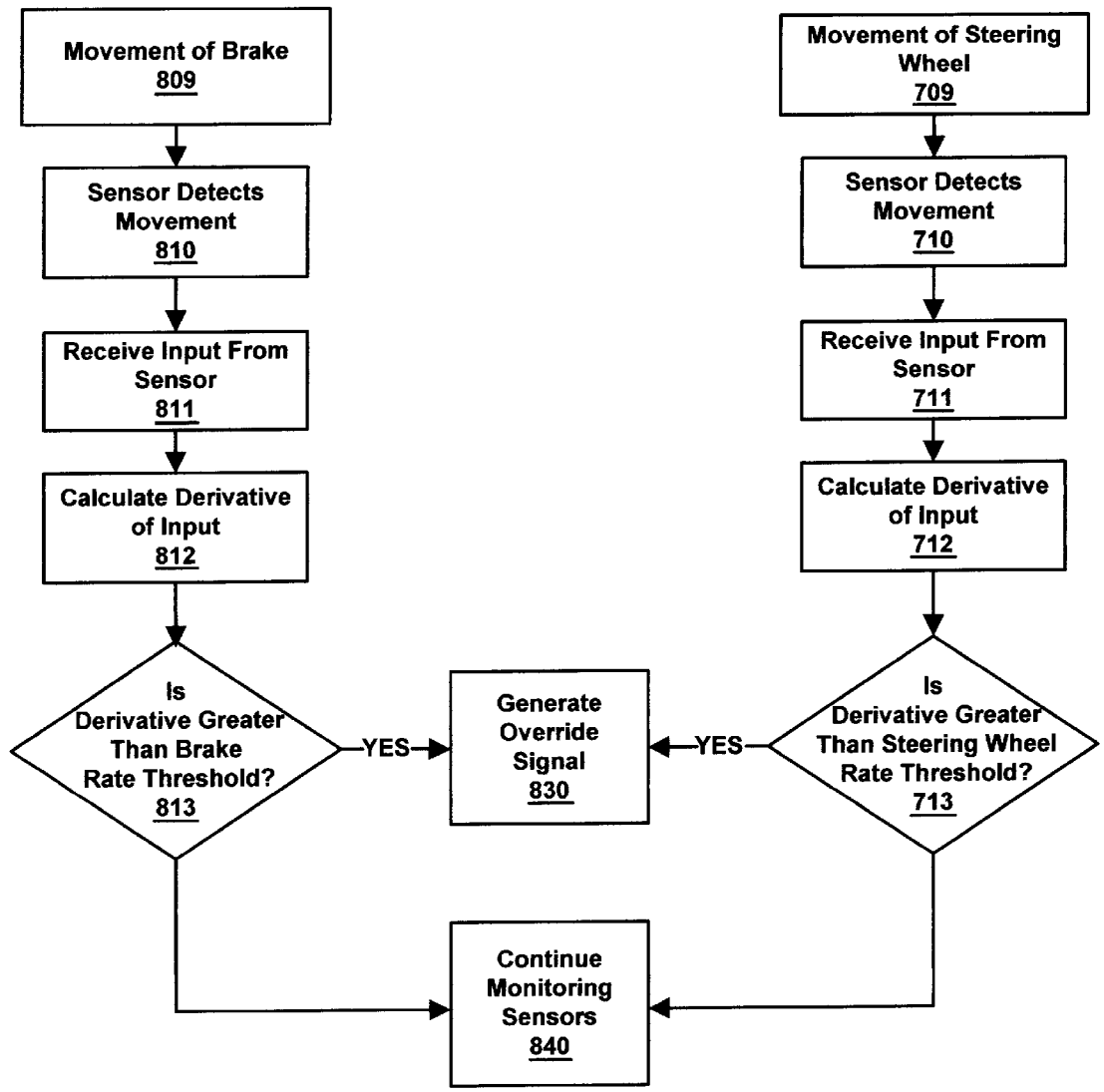
FIG. 8 is a schematic diagram illustrating the steps for overriding a vehicle steering system using the change or rate of change of the movement of the steering wheel and the brake in accordance with the present invention.
Figure 9:
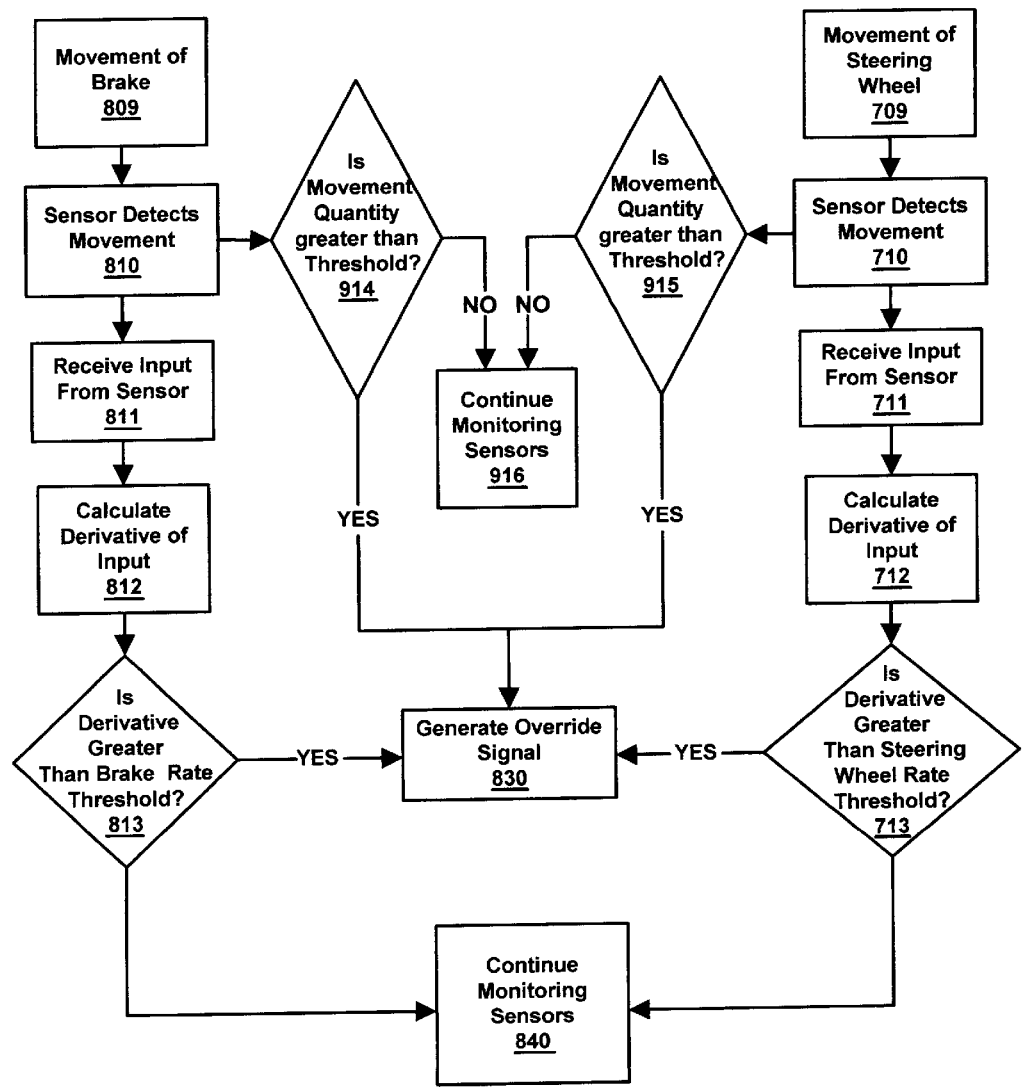
FIG. 9 is a schematic diagram illustrating the steps for overriding a vehicle steering system using both rate of change and amount of movement of steering wheel and brake in accordance with the present invention.

FIG. 8 shows steps for overriding a guidance control system using an override system which includes a sensor which monitors the vehicle braking system. Override control systems which include sensors that monitor vehicle braking systems include override system 500 of FIG. 5 and override control system 600 of FIG. 6. As shown in FIG. 7, in response to movement of the steering wheel which is sufficiently abrupt such that the derivative of the input is greater than a predetermined threshold, an override signal is generated as shown by steps 709–713 and 830 and 840. In addition, movement of the brake may generate an override signal as shown by steps 809–813 and 830, and 840. Upon movement of the brake as shown by step 809 of FIG. 8, the movement is detected by sensors as shown by step 810. Sensors for monitoring the vehicle braking system include sensor 510 of FIG. 5 and sensor 235 of FIG. 6 which monitor vehicle braking system 501 of FIGS. 5–6. Sensor 510 of FIG. 5 and sensor 235 of FIG. 6 may be either analog or digital sensors. Preferably, the sensors are digital such that the movement detected by the sensor is transmitted as an electronic signal in digital form. The movement detected by the sensor is received as input as shown by step 811. In the embodiment shown in FIG. 5, the input is received by override control unit 512 and in the embodiment shown in FIG. 6, the input is received by control unit 612. The derivative of the input is then calculated as shown by step 812 and the calculated derivative is compared to a predetermined threshold as shown by step 813. If the derivative does not exceed the threshold, an emergency condition will not be indicated and the monitoring of sensors will be continued as shown by step 840. When the derivative does exceed the threshold, as shown by blocks 813 and 830, an override signal is generated. The override signal is transmitted to the guidance control system so as to shut off the automated steering control function of the guidance control system. In the embodiment shown in FIGS. 2 and 5, the override signal is transmitted to control system 132 and in the embodiment shown in FIGS. 3 and 6, the override signal is sent to control system 232 so as to shut off the automated steering control functions of guidance control system 130 of FIGS. 2 and 5 and guidance control system 230 of FIGS. 3 and 6 so as to return control of vehicle steering system 120 to the operator of the vehicle. In the embodiment shown in FIG. 9, the amount of movement of the brake and the steering wheel is also used to determine whether an emergency condition exists. Thus, either a rapid movement of the brake or the steering wheel will generate an override condition or an amount of movement exceeding a predetermined threshold will generate an override condition. As shown by steps 914 and 930, when the threshold for the amount of movement (movement quantity threshold) exceeds the predetermined threshold for brake movement (brake movement quantity threshold), am override signal is generated. When the brake movement does not exceed the brake movement quantity threshold no emergency condition is indicated and the sensors will continue to be monitored as shown by steps 915–916. As shown by steps 915 and 930, when the threshold for the amount of movement (movement quantity threshold) exceeds the predetermined threshold for steering wheel movement (steering wheel movement quantity threshold), am override signal is generated. When the steering wheel movement does not exceed the steering wheel movement quantity threshold no emergency condition is indicated and the sensors will continue to be monitored as shown by steps 914 and 916.

The quantity thresholds are determined such that normal operation of the vehicle and operator activity during normal operation of the vehicle does not generate an override signal but intentional deliberate movement sufficient to indicate an emergency condition will generate an override condition. For example, the steering wheel movement quantity threshold is set such that accidental movement by brushing the steering wheel will not generate an override signal and that intentional deliberate movement sufficient to indicate an emergency condition will generate an override signal.

The override system shown in FIGS. 2–9 is shown to use a single sensor for sensing steering system movement. In one embodiment, both a movement amount sensor and a movement rate sensor are coupled to the steering system. In this embodiment the movement rate sensor gives the rate of change of the movement of the steering wheel; therefore, there is no need to calculate the derivative as shown by step 712 of FIGS. 7–9.

The override system shown in FIGS. 2–9 is shown to use a single sensor for sensing brake pedal movement. In one embodiment, both a movement amount sensor and a movement rate sensor are coupled to the brake system. In this embodiment the movement rate sensor gives the rate of change of the movement of the brake pedal; therefore, there is no need to calculate the derivative as shown by step 812 of FIGS. 8–9.

Cruise control systems have been used in vehicles for many years. In some cruise control systems, and most notably in cruise control systems installed in automobiles and trucks, pressing of the brake pedal is used to discontinue the cruise control feature. However, such cruise control systems only control the speed of the vehicle. Such systems do not control the direction of travel of the vehicle at all. The present invention relates to systems which control the direction of travel, not the speed of the vehicle. Thus, the present invention is quite distinct from prior art cruise control systems which use brake pedal activation to discontinue the cruise control feature.

The override system of the present invention is also well suited for operation in response to the movement of the vehicle's clutch petal. In one embodiment a sensor is placed on the clutch mechanism for sensing movement of the clutch pedal. Either the rate of change of the movement of the clutch pedal or the quantity of movement of the clutch pedal, or both is then used to determine whether an override signal is to be sent to the vehicle's guidance control system.

In one embodiment of the present invention the turn rate profile of the vehicle is stored in memory and is compared with the speed of the vehicle and the instructions for movement of the steering system generated by the vehicle guidance control system each time the vehicle is to be turned. When the instructions for turning the vehicle exceed the turn rate profile for the vehicle an emergency condition is determined to exist and an override signal is sent to the vehicle guidance control system so as to return control of the vehicle to the operator. This prevents the vehicle from turning over when the vehicle guidance control system attempts to turn the vehicle so sharply that the vehicle may turn over. Alternatively a sensor coupled to the steering system is used to determine the rate of turn of the vehicle. In one embodiment the revolutions per minute and gear information are compared along with speed and rate of turn in order to determine whether an emergency condition exists. In one embodiment, a tilt sensor is used to determine the tilt of the vehicle. The tilt information is used along with speed and rate of turn to determine if an emergency condition exists. The use of a tilt sensor is particularly useful when the vehicle is operated over uneven surfaces such as hills, terraces, and in contour farming applications.

The override system of the present invention is also well suited for use with an emergency shutoff switch. In one embodiment, an emergency shutoff switch is located where the operator may easily reach it. The operation of the emergency shutoff switch by the operator of the vehicle will then generate an override signal such that control of the vehicle is returned to the operator.

The override system of the present invention is well suited for implementation directly into a guidance control system, either as a software program or a set of executable instructions to be performed by the guidance control system. In one embodiment, the override system of the present invention is stored in the control system of the guidance control system as a software program which receives input from sensors which are a part of the guidance control system such as sensors 235 of FIGS. 3 and 6. In an alternate embodiment, the override system of the present invention is stored in a computer useable medium such as a floppy disk or a computer disk (CD) or a removable tape storage device as a software program.

Though the override system of the present invention is shown to shut off the vehicle guidance system by generating an electrical signal which shuts off the automatic steering control feature of the guidance control system, depending on the configuration of the guidance control system, other methods of shutting off the automatic steering control feature may also be used. In one embodiment, the automatic steering control feature is shut off by sending an electrical signal directly to the electro-hydraulic valve that controls the steering. Alternatively, the power to the guidance control system may be cut off by placing an electrically activated switch in the electronic circuit supplying power to the guidance control system.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the claims appended hereto and their equivalents.

What is claimed is:

1. For a tractor that includes a steering system and a guidance control system that has an automatic steering control feature that can be engaged so as to automatically control the steering system, a method of overriding the guidance control system comprising:

a) monitoring a first sensor coupled to a steering wheel, said first sensor for detecting the rate of movement of said steering wheel;

b) monitoring a second sensor coupled to said steering wheel for detecting the amount of movement of said steering wheel;

c) overriding said guidance control system when said first sensor indicates that the rate of movement of said steering wheel is greater than a rate threshold and when the amount of movement of said steering wheel is greater than a movement quantity threshold so as to return control of the tractor to the operator of the tractor;

d) monitoring the speed of the tractor;

e) determining the rate of turn of the tractor;

f) comparing the rate of turn and the speed of the tractor to the turn rate profile of the tractor so as to determine whether an emergency condition exists; and g) overriding said guidance control system when said the comparison of step f) indicates that the rate of turn exceeds the maximum rate of turn for the speed of the tractor.

2. The method of claim 1 wherein a tilt sensor is monitored, and wherein step f) further comprises comparing the rate of turn and the speed of the tractor and the tilt of the tractor to the turn rate profile of the tractor so as to determine whether an emergency condition exists and wherein step g) further comprises overriding said guidance control system when the rate of turn exceeds the maximum rate of turn for the speed of the tractor and the tilt of the tractor.

3. An override system for a tractor that includes a steering system including a steering wheel and a guidance control system that includes an automatic steering control feature, said override system including:

a first sensor coupled to said steering system for detecting the rate of movement of said steering wheel;

a second sensor coupled to said steering system for detecting the amount of movement of said steering wheel; and a control unit coupled to said first sensor and coupled to said guidance control system, said control unit overriding said guidance control system so as to disengage said automatic steering control feature when the rate of movement of said steering wheel is greater than a rate threshold and when the amount of movement of said steering wheel is greater than a movement quantity threshold, said control unit comparing the rate of turn and the speed of the tractor to the turn rate profile of the tractor and overriding said guidance control system when the rate of turn exceeds the maximum rate of turn for the speed of the tractor so as to return control of the tractor to the operator of the tractor.

* * * * *